(No Model.)
O. A. WHEELER.
PUZZLE.
No. 466,925.  Patented Jan. 12, 1892.
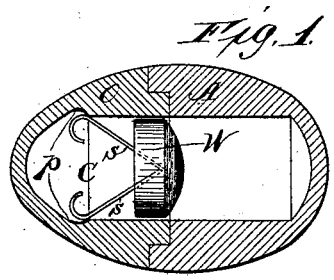
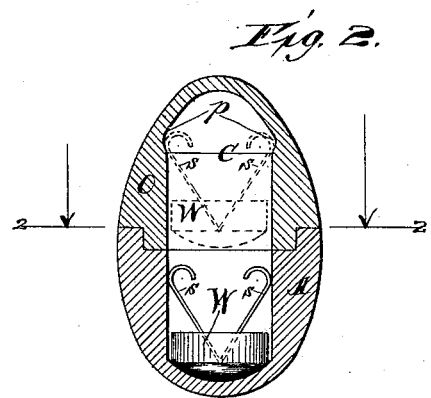
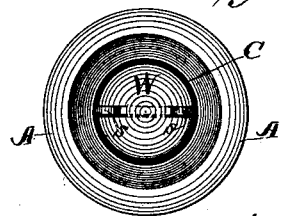
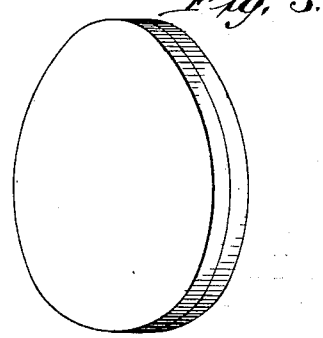
Witnesses.
Chas. E. Gorton
Katie Wheeler
Inventor,
Orrin A. Wheeler

UNITED STATES PATENT OFFICE.

ORRIN A. WHEELER, OF CHICAGO, ILLINOIS, ASSIGNOR TO THE WHEELER NOVELTY COMPANY, OF SAME PLACE.

PUZZLE.

SPECIFICATION forming part of Letters Patent No. 466,925, dated January 12, 1892.

Application filed August 20, 1891. Serial No. 403,218. (No model.)

*To all whom it may concern:*

Be it known that I, ORRIN A. WHEELER, a citizen of the United States, residing at Chicago, in the county of Cook and State of Illinois, have invented certain new and useful Improvements in Toys; and I hereby declare the following to be a full, clear, and exact description of my invention, such as will enable others skilled in the art to which it belongs to make and operate the same, reference being had to the accompanying drawings, and to the letters of reference marked thereon, which form a part of this specification.

My invention consists of an artificial egg composed of any suitable material—such as wood, metal, or paper—provided with a movable weight, the position of which can be readily changed so as to make the egg lie on its side or stand on end when placed in an upright position and jarred or tapped downward, causing the weight to move below the center of gravity, as more fully described below. It is further intended that this toy will be quite interesting, from the fact that a novice not acquainted with the workings of this egg will be unable to make it stand on end, although any one can do it when they know how. These objects I attain by means of the device illustrated in the accompanying drawings, in which—

Figure 1 is a cross-sectional view showing the weight W in position to cause the egg to lie on its side. Fig. 2 is a sectional view showing the weight W moved to one end, so the egg will remain in an upright position when so placed on a smooth surface. Fig. 3 is a perspective view showing the egg with its sides made flat. Fig. 4 is an end view of one of the halves of the outer shell detached from the other.

The outer shell of the egg is made in two sections, which can be divided at any place most convenient to manufacture.

In the drawings, Figs. 1 and 2, I show the shell so divided at T that the part O fits the part A, like the cover on the common wooden box, and glued or cemented together. This is the most convenient way when wood is used.

I do not wish to confine myself to a perfect egg-shaped outer shell, as that can be made flat on two sides, as shown in the perspective view, Fig. 3, and not depart from the spirit of my invention.

C in Figs. 1 and 2 is an opening or way, extending from one end of the egg to the other, in which the weight W slides. This opening may be round or any other shape, while its sides remain parallel.

W is a weight made to conform to the size and shape of the longitudinal opening C and just large enough to slide up and down in same.

S S are springs securely fastened to the weight W by any desired means and diverging from each other, so that the outer ends, which are slightly turned in, will press against the opposite sides of the long opening C with sufficient force to retain the weight W in either of the positions shown in the drawings. It will be seen that when the weight W is in the central position, as shown in Fig. 1, the springs S S will hold it there and the egg will not stand on end; but if the operator takes the egg in his hand and gives it a quick jerk or slightly raps the end of the egg toward which he wants the weight to move, the momentum of the weight will overcome the friction of the springs S S and move to the position shown in Fig. 2, when the egg can readily be stood on end. By reversing this maneuver of course the egg will again lie on its side.

At one end of the slideway or opening C is a groove or indenture P, in which the rounded ends of the springs S S will enter when the weight is in position shown in Fig. 1, to more firmly hold the weight in the center, so that it will require considerable more force to move it to the end position than it does to move it from end position to the central. In fact, it may be so adjusted that by holding the top end down, the weight W will slide by its own weight to the center, but can only be moved to the end by a sharp blow or jar downward.

Having thus fully described my invention, what I claim, and desire to secure by Letters Patent, is—

1. The herein shown and described toy, composed of the outer egg-shaped shell O A, having a longitudinal opening C, and the sliding weight W, having springs S S, as shown, and for the purpose specified.

2. The herein shown and described toy, composed of the outer egg-shaped shell O A, having a longitudinal opening C, said opening having a groove or indenture P at one end, and the movable weight W, having springs S S with the outer ends bent so as to fit in the groove P when the weight is in the central position, as shown, and for the purpose set forth.

3. The herein shown and described toy, composed of the outer egg-shaped shell having its two opposite sides flattened, as shown in Fig. 3, and having a longitudinal opening C, and the sliding weight W, having springs S S, substantially as shown, and for the purpose specified.

In testimony whereof I have hereunto affixed my signature this 10th day of July, 1891.

ORRIN A. WHEELER.

Witnesses:
ANNIE G. WHEELER,
DAISY B. WHEELER.